United States Patent
Shivanna

(10) Patent No.: US 12,063,217 B2
(45) Date of Patent: Aug. 13, 2024

(54) SYSTEMS AND METHODS FOR GENERATING AND IMPLEMENTING SECURITY PROFILES

(71) Applicant: Hewlett Packard Enterprise Development LP, Houston, TX (US)

(72) Inventor: Suhas Shivanna, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 433 days.

(21) Appl. No.: 17/464,877

(22) Filed: Sep. 2, 2021

(65) Prior Publication Data

US 2022/0321568 A1    Oct. 6, 2022

(30) Foreign Application Priority Data

Apr. 1, 2021    (IN) ............................. 202141015719

(51) Int. Cl.
| | |
|---|---|
| *H04L 9/40* | (2022.01) |
| *G06F 8/30* | (2018.01) |
| *G06F 11/36* | (2006.01) |
| *G06Q 30/018* | (2023.01) |
| *G06F 3/04842* | (2022.01) |
| *G06Q 10/087* | (2023.01) |

(52) U.S. Cl.
CPC ............. *H04L 63/102* (2013.01); *G06F 8/30* (2013.01); *G06F 11/3688* (2013.01); *G06Q 30/018* (2013.01); *H04L 63/20* (2013.01); *G06F 3/04842* (2013.01); *G06Q 10/087* (2013.01)

(58) Field of Classification Search
CPC ......... H04L 63/102; H04L 63/20; G06F 8/30; G06F 11/3688; G06F 3/04842; G06F 2221/034; G06F 9/44505; G06F 21/57; G06Q 30/018; G06Q 10/087
See application file for complete search history.

(56) References Cited

U.S. PATENT DOCUMENTS

| | | | |
|---|---|---|---|
| 8,490,148 B2 | 7/2013 | Sikka et al. | |
| 10,423,404 B2 | 9/2019 | Sanghvi et al. | |
| 10,805,154 B2 | 10/2020 | D'Onofrio et al. | |
| 10,872,029 B1 | 12/2020 | Bawcom | |
| 2002/0169975 A1* | 11/2002 | Good | H04L 41/0806 726/1 |
| 2003/0055939 A1* | 3/2003 | Kayashima | H04L 41/0253 709/223 |
| 2005/0022027 A1* | 1/2005 | Bonn | H04L 63/1425 726/4 |
| 2005/0138416 A1* | 6/2005 | Qian | H04L 63/0263 726/4 |

(Continued)

*Primary Examiner* — Trong H Nguyen
(74) *Attorney, Agent, or Firm* — Trop, Pruner & Hu, P.C.

(57) ABSTRACT

Examples disclosed herein relate to systems and methods for generating and implementing a security profile. Disclosed methods may include the steps of generating a customer intent interface configured to receive input comprising a value associated with an intent parameter; receiving, via the customer intent interface, security intent information comprising the value and the intent parameter; generating a configuration file based on the security intent information; based on the configuration file, generating a security profile for a target device; and generating, by code generator framework, one or more scripts based on the security profile.

20 Claims, 7 Drawing Sheets

(56) References Cited

U.S. PATENT DOCUMENTS

2013/0247128 A1* 9/2013 Hinchliffe ............... H04L 51/00
726/1
2020/0387357 A1 12/2020 Mathon et al.

* cited by examiner

SYSTEMS AND METHODS FOR GENERATING AND IMPLEMENTING SECURITY PROFILES

BACKGROUND

Security misconfiguration, operator errors, and inadequate controls may result in security breaches. In computing systems, a hardware device may have numerous technical controls capable of hundreds of security configurations. Currently, most systems require manual effort to create security baselines based on customer security requirements. It can be a very cumbersome task to port these baselines to various configuration management tools that are used to automate security configuration in large enterprises.

To compound the difficulty of establishing a security baseline, security and compliance requirements may change rapidly in response to new security threats. This adds to the manual efforts required to keep the baseline relevant for modern threats.

Accordingly, there exists a need for a dynamic solution to enable and facilitate agile device security configuration that works with various configuration management tools.

BRIEF DESCRIPTION OF THE DRAWINGS

The following detailed description references the drawings, wherein.

Figure 1:
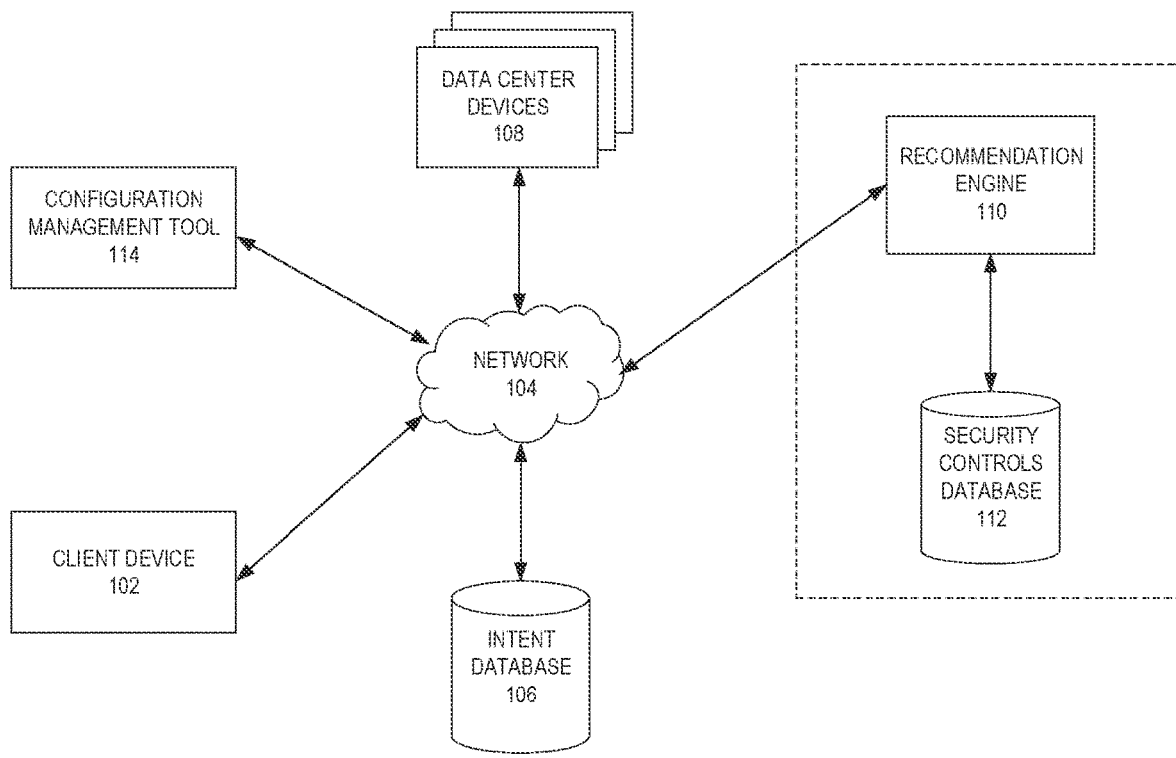
FIG. 1 is a block diagram of an example computer network system, in accordance with disclosed embodiments.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As detailed above, security misconfiguration, operator errors and inadequate controls may often lead to security breaches. In a typical hardware device, there may be multiple technical controls effecting the security of the device with each control being associated with one or more configuration values, yielding hundreds of possible security configurations. With hardware and firmware becoming an attack surface, not only is the need for hardware security increasing, but the number and type of security controls included in hardware devices is evolving.

Balancing security, usability, risk and performance is a key requirement for the modern business as high security can impact usability, performance and maintainability. One current solution is to configure a system based on the customer business needs. However, this solution requires security administrators to read product-specific documents and whitepapers, which contain technology- and product-specific security features, in order to identify the security configuration or baseline of the system that balances risk, usability, performance, and business agility requirements.

In another example, some entities adopt an Infrastructure-as-Code (IaC) solution using various configuration management tools like Chef, Puppet and Ansible. In such configuration management approaches, the identified baseline security level is translated manually into code/scripts that are then used by an IaC tool to provision the controls on a managed device. However, the process of determining the security baseline and writing scripts tailored to the needs of the workload/business for the selected IaC tool is a manual, cumbersome, and error-prone activity. For example, a security administrator must understand the technology stack, workload needs, device features, API interfaces/tools, and IaC scripting syntax/tools for writing these vendor-specific IaC modules, Additionally, with new security features being periodically released in updates, the security administrators need to be knowledgeable regarding the new updates in order to modify the scripts to use the newer security features. The scripts may also need to be updated whenever there is a change in risk landscape (e.g. an identified weakness to certain encryption algorithm) or compliance threat landscape (e.g. new recommendations from standards like PCI-DSS). The multiple security configurations needed for different types of workloads and the multiple IaC solutions may result in script sprawls, making balanced security configuration a cumbersome and error prone activity.

Accordingly, various examples disclosed herein relate to agile and dynamic security baseline generation using an IaC framework. The IaC framework may be configured to perform changes on or configure infrastructure, e.g., one or more computing devices using the appropriate tool specific infrastructure. For example, disclosed embodiments may enable a user to generate a security baseline for a device with little knowledge of the possible underlying security controls. The system may further use an IaC framework to generate unique scripts for each available configuration management tool. The unique scripts can be pushed to the corresponding configuration management tool to complete the configuration operation.

In particular, examples disclosed herein relate to systems and methods for generating a security baseline based on security intent information received from a user via a graphical user interface (GUI). In some embodiments, the systems and methods may eliminate the need for the user to have detailed knowledge of underlying systems, and may enable a user to select security parameters, which are then mapped to particular device security settings. Accordingly, the user does not need to have detailed knowledge of the underlying device or system to implement a security profile.

Further, the system may generate one or more scripts using an infrastructure-as-code (IaC) framework. Each script may be associated with a particular component or tool and may be configured to establish the required level of security on the device or system. Thus, by selecting one or more security parameters through a GUI, a user may automatically generate a device- and/or system-specific security profile that may be dynamically deployed using the generated scripts.

Disclosed embodiments are adaptable and dynamic, such that the system may be easily updated or modified based on, for example, varying security requirements, new security standards, new hardware components, etc. For example, if a new security standard becomes required in a particular industry, a user may simply select the standard via the GUI and the system may automatically generate scripts containing new technical controls and configuration instructions, which then can be used to update security on one or more devices or systems according to the standard. This may be done without knowledge of the particular standard requirements or of the underlying device and/or system on the part of the user, thereby facilitating, simplifying and encouraging security compliance.

FIG. 1 is a block diagram of an example system 100, in accordance with disclosed embodiments. The system 100 may include a client device 102, intent database 106, data center devices 108, recommendation engine 110, and security controls database 112, which are communicatively coupled via network 104. In certain examples, the client device 102, data center devices 108, the recommendation engine 110, and/or configuration management tool 114 are computing devices, such as servers, client computers, desktop computers, mobile computers, etc. In other examples, the client device 102, data center devices 108, the recommendation engine 110, and/or configuration management tool 114 can include special purpose machines. The client device 102, data center devices 108, recommendation engine 110, and/or configuration management tool 114 can be implemented via a processing element, memory, and/or other components.

Client device 102 may be, for example, a mobile device, a smartphone, a laptop computer, a desktop computer, etc. Other client devices, including any computing device, is possible as well. Client device 102 may be configured to display, via a screen, touchscreen, or other output device, a user interface configured to display one or more intent variables, each having one or more selectable security parameters or levels. A user may, via the interface, select one or more levels or values for each intent variable. An intent variable may refer to a security category such as physical security, detectability, authentication, compliance, etc.

The network 104 may use wired communications, wireless communications, or combinations thereof. Further, the network 104 may include multiple sub-communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the network 104 can be in the form of a direct network link between devices. Various communications structures and infrastructure can be utilized to implement the communication network(s).

By way of example, the client device 102, intent database 106, data center devices 108, recommendation engine 110, security controls database 112, and configuration management tool 114 may communicate with each other and other components with access to the network 104 via a communication protocol or multiple protocols. A protocol can be a set of rules that defines how nodes of the network 104 interact with other nodes. Further, communications between network nodes can be implemented by exchanging discrete packets of data or sending messages. Packets can include header information associated with a protocol (e.g., information on the location of the network node(s) to contact) as well as payload information.

Intent database 106 may be any suitable combination of data storage devices, which may optionally include any type or combination of load balancers, dummy servers, firewalls, back-up databases, and/or any other desired database components. In some embodiments, intent database 106 may be employed as a cloud service. In some embodiments, intent database 106 may be a remote storage location, such as a network drive or server in communication with network 104. In other embodiments, intent database 106 may be a local storage device, such as local memory of one or more computing devices.

Intent database 106 may be configured to store the values associated with the intent parameters in a configuration file. For example, intent database 106 may store the selected values in a declarative syntax as one or more extensible markup language (XML) and/or JavaScript Object Notation (JSON) files. The configuration file may store a high-level security intent profile for the user. For example, the configuration file may store the values of the intent parameters received via a GUI displayed on client device 102. The configuration file may be used by recommendation engine 110 to generate a security profile based on the user input.

Data center devices 108 may be one or more computing devices for which the user may generate a security profile. Data center devices 108 may include one or more of a server, a switch, a storage enclosure, a virtual machine, and/or other computing device. Data center devices 108 may include a server having a processor, memory, input/output device, data storage, etc. For example, data center devices 108 may include a server configured to communicate with client device 102 via network 104.

Data center devices 108 may include computing systems and/or hardware/software having one or more security configurations. For example, each data center device may have a unique set of security parameters that may be individually set by a user or system administrator. For example, a server has a management processor that has unique security parameters to configure password policy, data encryption algorithm requirements, data center services configuration like Simple Network Management Protocol (SNMP) etc.

Recommendation engine 110 may be configured to retrieve the configuration file from intent database 106 and use the values stored in the configuration file to generate a security profile containing the recommended security controls of one or more of data center devices 108 based on the received values for the intent parameters. In some embodiments, the configuration file may be generated at client device 102 and transmitted, via network 104, to recommendation engine 110. In other embodiments, recommendation engine 110 may receive the user input from client device 102 and generate the configuration file.

Using the configuration file, the recommendation engine 110 may query a security controls database 112. Security controls database 112 may be any suitable combination of data storage devices, which may optionally include any type or combination of load balancers, dummy servers, firewalls, back-up databases, and/or any other desired database components. In some embodiments, security controls database 112 may be employed as a cloud service. In some embodiments, security controls database 112 may be a remote storage location, such as a network drive or server in communication with network 104. In other embodiments, security controls database 112 may be a local storage device, such as local memory of one or more computing devices.

Security controls database 112 may be configured to store, for example, a mapping correlating the selectable values of the intent parameters to settings of security controls of particular data center devices 108. For example, security controls database 112 may store a mapping of a unique device or product (e.g. a particular family of server) or component ID (e.g. firmware entities or a particular family of network 10 cards) and ail supported security controls using a unique name for these products and components. Each security control identified by the unique name may contain supported values and configuration instructions that map to all potential selectable values of the intent parameter. For example, the intent parameter or category exposed to the user via the GUI, may be physical security, authentication, availability, protection, detection and recovery. The user-selectable value for the intent parameter may take values from the range of high, medium, standard that map to the user's desired security needs. The security controls database may contain the supported technical security controls for the device or component with unique tags that map to the exposed intent parameter (e.g. physical security, authentication etc.) and selectable values (e.g. high, medium, standard).

Thus, recommendation engine 110 may query security controls database 112 based on the configuration file and/or a device type. The device type may be identified in the configuration profile or may be received as metadata from client device 102. In some embodiments, the device type and installed components of each device of the data center devices 108 may be received from a database storing a device inventory associated with the user. For each device type, security controls database 112 may store all applicable configurable security controls along with the mapping information to intent parameter and device specific configuration instructions. Configurable security controls may include selection of encryption algorithms, access control to external ports, authentication requirements that includes password policies, security alerts settings, etc. In some embodiments, security controls database 112 may further store control settings that correspond to each selectable value associated with an intent parameter. The query results may be used by recommendation engine 110 to generate a security profile based on the user-input values of the intent parameters. This security profile may be vendor-independent and generic with applicable security controls and configuration instructions stored in JSON/XML format. The security profile may contain data describing the recommended security settings for a target device or target devices (e.g., different data center devices 108) based on the received user input. For example, the security profile may include a device type or ID and may specify the values for various configurable security settings of the device and their mappings to each value of the intent parameters.

In some embodiments, recommendation engine 110 may be further configured to use the security profile to generate IaC tool-specific scripts. The generated scripts may be pushed to configuration management tool 114 and may enable device (e.g., data center devices 108) components to automatically provision configuration modules that may modify the security controls of the device in accordance with the security profile and user intent, Thus, the system avoids tool-specific complexity associated with implementing a particular level of security on a hardware device or system.

Configuration management tool 114 may be a computer, server, or other processing device. For example, configuration management tool 114 may be a DevOps configuration management tool such as Ansible, Chef, or Puppet. The configuration management tool 114 may vary between users and/or devices. Accordingly, the system 100 may enable a user to configure the security of data center devices 108 without reliance on a specific configuration tool and without manual generation of scripts for each IaC tool.

Figure 2A:
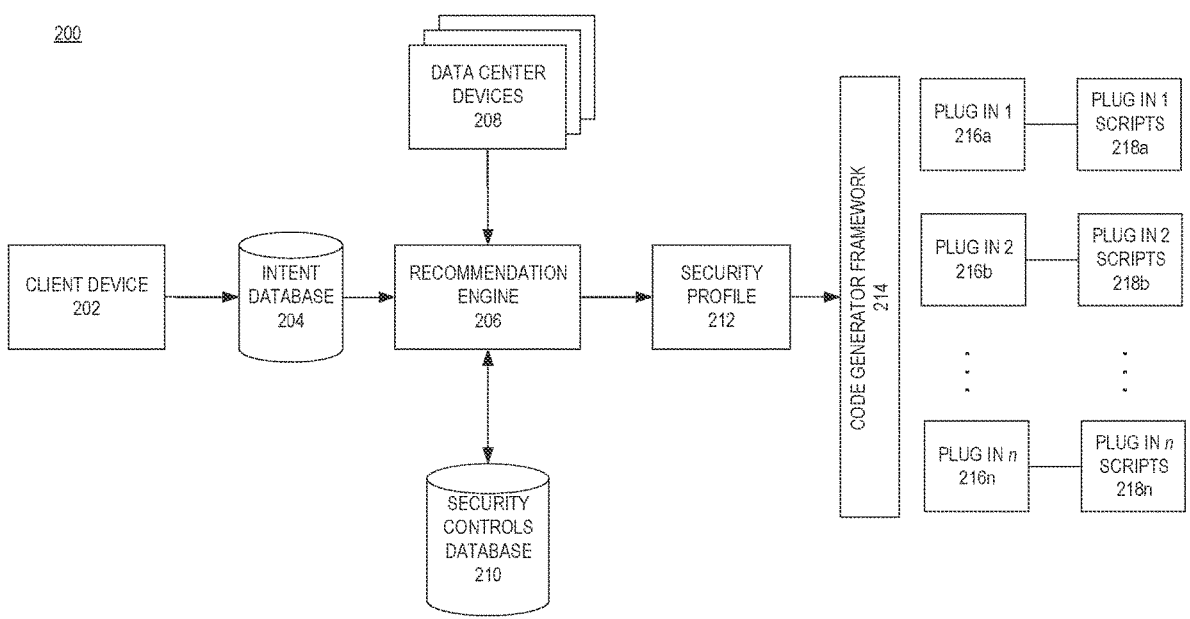
FIG. 2A is a block diagram of another example system, in accordance with disclosed embodiments.

FIG. 2A is a block diagram of another example system 200, in accordance with disclosed embodiments. The various elements of system 200 may be similar or substantially similar to those described with reference to FIG. 1. Other arrangements are possible.

Client device 202 may be a computing device having a display. Client device 202 may be configured to display a GUI including selectable values for one or more intent parameters. The intent parameters may include, for example, physical security with selectable values like "High," "Medium," "Standard," etc. Other examples of intent parameters and selectable values include compliance requirements (e.g., standards such as General Data Protection Regulation (GDPR), Federal Information Processing Standards (APS), Payment Card Industry Data Security Standard (PCI-DSS) etc.), asset security needs (e.g., "Top Secret," "Secret," "Sensitive," etc.), management network security requirements (e.g., "High," "Medium," "Standard," etc.), data center services security requirements for services like domain name system (DNS), lightweight directory access protocol (LDAP), network time protocol (NTP), etc., authentication requirements (e.g. password policy requirements), and/or availability requirements (e.g. API rate limiting). In some embodiments, the intent parameters may include security detection requirements (e.g., "High," "Medium," "Standard," etc.) which may map to product security alerting configuration and other product-specific features such as monitoring of run time firmware corruption, run time security diagnostics etc. In another embodiment, the intent parameters may include security recovery requirements (e.g., automated or human-assisted recovery etc.) which could potentially map to system restore features in certain devices or systems.

Figure 2B:
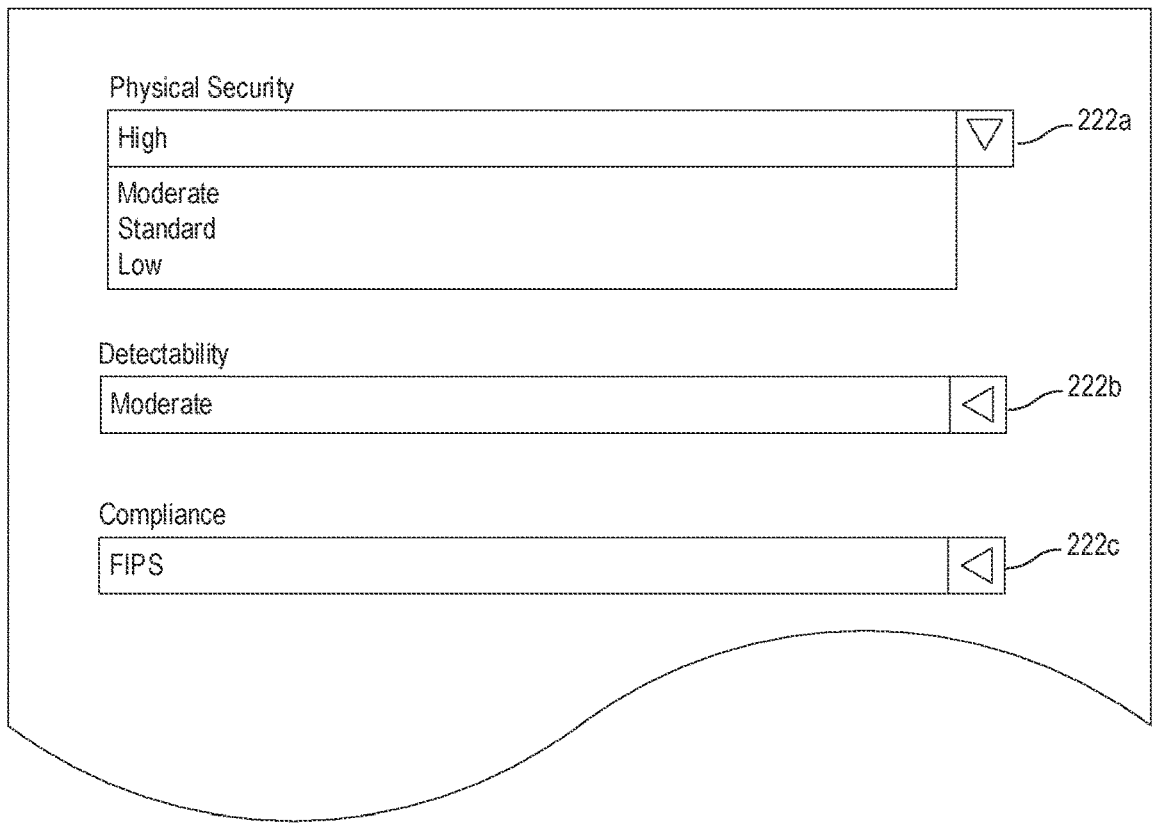
FIG. 2B is an illustration of an exemplary graphical user interface (GUI), in accordance with disclosed embodiments.

FIG. 2B is a partial illustration of an exemplary GUI 220, which may be displayed via client device 202. GUI 220 may display one or more intent parameters (e.g., "Physical Security," "Detectability," "Compliance," etc.) The intent parameters illustrated in FIG. 2B are not meant to be an exhaustive list and other intent parameters may be included and displayed by GUI 220. GUI 220 may display one or more dropdown menus (e.g., menus 222a, 222b, 222c) having selectable values associated with each intent parameter.

Although not shown, the values associated with each parameter may be received as free text input, via radio button selection, via slider bar, etc.

As an example, a user may select "High" as the value for intent parameter "Physical Security," "Moderate" as the value for "Detectability," and "FIPS" as the "Compliance" requirement. Client device 202 may generate a configuration file storing these selected values and their respective intent parameters in a declarative syntax (e.g., as an XML or JSON file). This configuration file may be stored by intent database 204. In some embodiments, intent database 204 may also store a user identifier and/or device inventory associated with the user.

Returning to FIG. 2A, recommendation engine 206 may receive the configuration file along with information from data center devices 208 (e.g., a device inventory listing the devices of data center devices 208). For example, recommendation engine 206 may receive a device type and/or device ID associated with the device(s) for which the user wishes to generate a security profile. Based on the device type and/or device ID, recommendation engine 206 may query security controls database 210. The query may return, for example, a device profile containing device specific configuration data including settings associated with one or more security controls of the device and associated components.

Figure 2C:
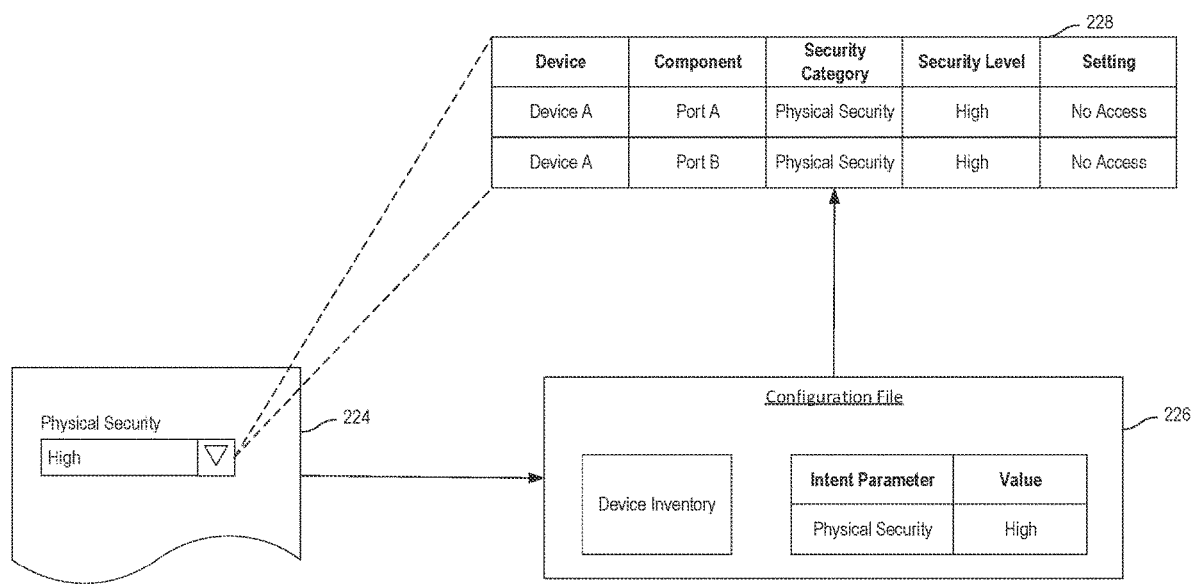
FIG. 2C is a block diagram illustrating a mapping of security intent to component settings, in accordance with disclosed embodiments.

Using the results returned from security controls database 210, recommendation engine 206 may generate a security profile 212, which includes the values at which the security controls should be set based on the received input from the user. In some embodiments, recommendation engine 206 may use one or more fingerprinting techniques for efficient generation of security profiles for standard device configurations. In some embodiments, the security profile may be an XML or JSON file, FIG. 2C is an exemplary illustration of the relationship between the user input 224, configuration file 226, and security profile 228. As previously discussed, a user may select a value for an intent parameter via a GUI, e.g., GUI 220. In this example, a user may select "High" for "Physical Security." This value may be captured and stored as a configuration file in intent database 204. In some embodiments, the configuration file may include a device inventory associated with the system for which the user wishes to configure the security. Recommendation engine 206 may receive configuration file 226 and query security controls database 210 based on one or more devices in the device inventory.

The query may return a security configuration data 228 mapping the values of the configuration file to different components' security settings. For example, the device inventory may include a "Device A," that could be a server from a specific vendor. Recommendation engine 206 may query security controls database 210 based on, for example, a device type or device ID associated with "Device A." The query may fetch records associated with the device, where the records contain the device-specific security control value and configuration instructions associated with the intent parameter and the user selected value for "Device A". For example, if the intent parameter is "Physical Security" and the user selected value is "high," the record may contain all security controls for the device that meet the user intent of having a high physical security configuration. Recommendation engine 206 may retrieve records for all devices of the device inventory and their components. Thus, a user configuring the security of a set of data center devices does not require knowledge of all the devices, their components, and/or their settings to configure the security of the devices.

Referring again to FIG. 2A, Code generator framework 214 may be part of recommendation engine 206 or may be a separate system or component. Code generator framework 214 may be, for example, an IaC translator framework. Code generator framework 214 may receive security profile 212 and generate IaC tool-specific scripts. The code generator framework 214 may invoke specific plugins (e.g., plugins 216a, 216b, 216n) to automatically generate deployable plug-in scripts (e.g., plug-in scripts 218a, 218b, 218n) associated with one or more configuration management tools. For example, if the data center has Chef Configuration management tool, the code generator framework 214 can be used to generate scripts that are specific to Chef using the security profile 212.

Accordingly, system 200 may be used to implement security postures with fewer operator errors and less misconfiguration. Disclosed embodiments facilitate implementation of new product specific security features. For example, based on new features for meeting a customer-specified level of security, the system may automatically generate additional scripts or modify existing scripts to render the security profile for a given device to meet the new requirements. In some embodiments, the systems described herein may further be used to facilitate optimization of power controls or other device manageability cases.

Additionally, disclosed embodiments may automatically update security profiles based on a current security threat landscape and/or the risks of the customer. For example, the recommendation engine can be run periodically to look for changes in the security controls database and update the scripts or generate new scripts to meet the customer intent. Changes in the security controls database may reflect new features or new threats. The updated and/or new scripts may be generated and deployed on devices without manual interactions.

As an example, assume a user wishes to harden a server to have a highest level of available security. The customer may provide, via a GUI, respective intent parameters and values such as "Physical Security: High," "Compliance: HIPAA," "Asset Security: Confidential," "Management Network Security: High," "Security Detection: High," and "Security Recovery: Human-assisted." Upon receipt of these values, the system may generate a configuration file storing the above-described input in a declarative syntax.

A security controls database, e.g., database 210, may include records for all server hardware and firmware components, which may be identified by device type or device ID, and the corresponding security controls supported by the hardware and firmware components. In the security controls database, each of the security controls may be tagged with a category (e.g., "Physical Security") that maps to an intent parameter. For each device, associated components, and intent parameter, the database may store one or more device-specific security configuration settings associated with each selectable intent parameter value. In some embodiments, the security controls database may include information or instructions about how to configure the security control using device-specific APIs, OS commands, or one or manageability tools.

In this example, "Physical Security: High" may mean that, for a target device (e.g., a server), the "High" level of "Physical Security" maps to one or more settings such as, "IDS Latch=On," "Server Management Processor USB=Off," "Unused IO Slots=Disabled," "Physical Security Alerting=On (all anomaly events to be sent)," "Boot Using USB=Off," etc. By retrieving these settings from the security controls database, the recommendation engine, e.g., recommendation engine 206, may generate a security profile including all these configurations for the target device that meets the customer security intent. The security profile may contain all applicable security controls for the device supported peripherals (e.g. IO cards) and/or firmware components.

The generated security profile may then be used to generate IaC-specific modules using code generator logic. Because different customers use different IaC, or configuration management, solutions, it is difficult to generate and maintain IaC-specific scripts for security configuration using conventional methods. As an example, a code generator framework, e.g., framework 214, may include a plugin for Ansible that uses the security profile to generate Ansible-specific modules and syntax. In another embodiment, the code generator framework may include a Chef plugin configured to generate Chef-specific modules and syntax. Once the scripts are generated, they may be pushed to a configuration management tool, e.g., configuration management tool 114, which may in turn deploy the scripts on the appropriate devices.

Figure 3:
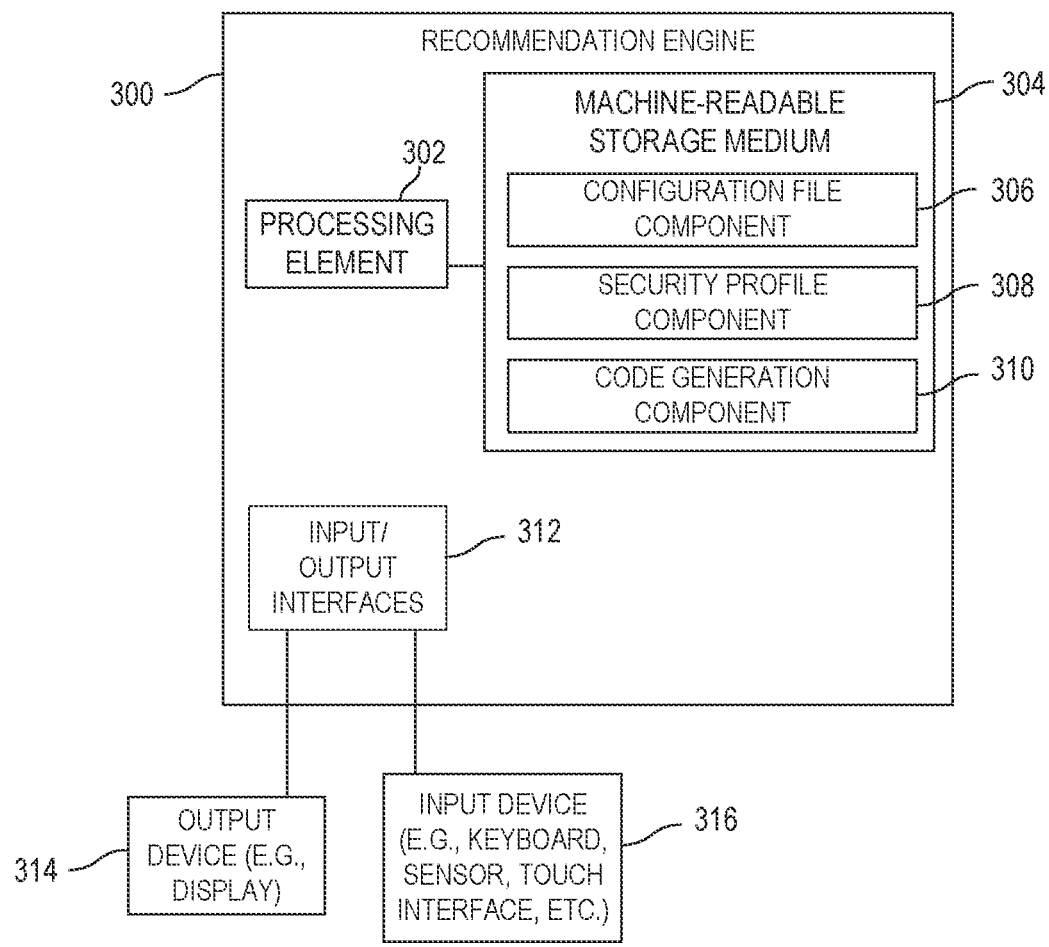
FIG. 3 is a block diagram of an example recommendation engine, in accordance with disclosed embodiments.

FIG. 3 is a block diagram of a computing device 300 for generating and implementing a security profile, according to disclosed embodiments. The computing device 300 includes, for example, a processing element 302, and a machine-readable storage medium 304 including components 306, 308, 310 for automatically generating and implementing a security profile. Computing device 300 may be, for example, a notebook computer, a slate computing device, a portable reading device, a wireless email device, a mobile phone, or any other computing device.

Processing element 302 may be, one or multiple central processing unit (CPU), one or multiple semiconductor-based microprocessor, one or multiple graphics processing unit (GPU), other hardware devices suitable for retrieval and execution of instructions stored in machine-readable storage medium 304, or combinations thereof. The processing element 302 can be a physical device. Moreover, in one example, the processing element 302 may include multiple cores on a chip, include multiple cores across multiple chips, multiple cores across multiple devices (e.g., if the computing device 300 includes multiple node devices), or combinations thereof. Processing element 302 may fetch, decode, and execute components 306, 308, 310 to implement a process for automatically generating and implementing a security profile based on security intent information received from a user. As an alternative or in addition to retrieving and executing instructions, processing element 302 may include at least one integrated circuit (IC), other control logic, other electronic circuits, or combinations thereof that include a number of electronic components for performing the functionality of components 306, 308, 310.

Machine-readable storage medium 304 may be any electronic, magnetic, optical, or other physical storage device that contains or stores executable instructions. Thus, machine-readable storage medium 304 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 304 may be encoded with a series of executable instructions for generating and implementing a security profile.

Each of the components 306, 308, 310 may include, for example, hardware devices including electronic circuitry for implementing the functionality described herein. In addition, or as an alternative, each component 306, 308, 310 may be implemented as a series of instructions encoded on a machine-readable storage medium of computing device 300 and executable by processor 302. It should be noted that, in some examples, some components are implemented as hardware devices, while other components are implemented as executable instructions.

Computing device 300 may further include input/output interfaces 312, which may include output device 314 (e.g., a display device) and input device 316 (e.g., keyboard, sensor, touch interface, etc.). Output device 314 may be configured to display a GUI including a list of security categories, each category including selectable security parameters. Input device 316 may enable a user to select values for one or more intent parameters for a target device or target devices based on a security intent or required level of security. In some embodiments output device 314 and input device 316 may be a single device (e.g., a touchscreen). In other embodiments, the GUI may be displayed to the user on a separate device, e.g., client device 102 or 202, which may be connected to computing device 300 via a network.

Configuration file component 306 may be configured to receive input from input device 316 that is indicative of the security intent of a user for a particular device (e.g., data center devices 108, 208). The received security intent may include one or more intent parameters and a respective value selected for each parameter. Based on the received input, configuration file component 306 may generate a configuration file defining the values of the intent parameters in a declarative syntax. In some embodiments, the configuration file may include a device inventory including the devices to be configured.

Security profile component 308 may receive the configuration file from configuration file component 306. In some embodiments, security profile component 308 may also receive, as part of the configuration file or as input received through the GUI, a device inventory including a device type or device ID associated with a target device for which the user intends to set up a security profile. Security profile component 308 may query a security controls database (e.g., database 112, 210) to retrieve a device profile containing device-specific security configuration settings.

The device profile may include a mapping of intent parameters and values to particular device controls and their associated settings. Security profile component 308 may use the device profile to generate a recommended security profile for the target device. For example, if a user specified a value of "High" for the intent parameter, "Physical Security," the device profile may indicate the required settings of one or more hardware or firmware components that will yield high physical device security. For each target device and their respective components, the security profile may include, based on the user input, a set of one or more controls and their required settings (e.g., the appropriate settings to meet the requirement of "High" security).

Code Generation component 310 may receive the security profile from security profile component 308. Based on the specified security control settings, code generation component 310 may generate one or more IaC-specific scripts configured to adjust the security controls of the respective device and associated components to the settings indicated in the security profile. Code generation component 310 may, in some embodiments, validate the scripts. In other embodiments, code generation component 310 may push the scripts to a configuration management server to deploy the scripts on the target device(s), thereby adjusting the security of the target device(s) to meet the level of security specified by the user via the GUI.

Figure 4:
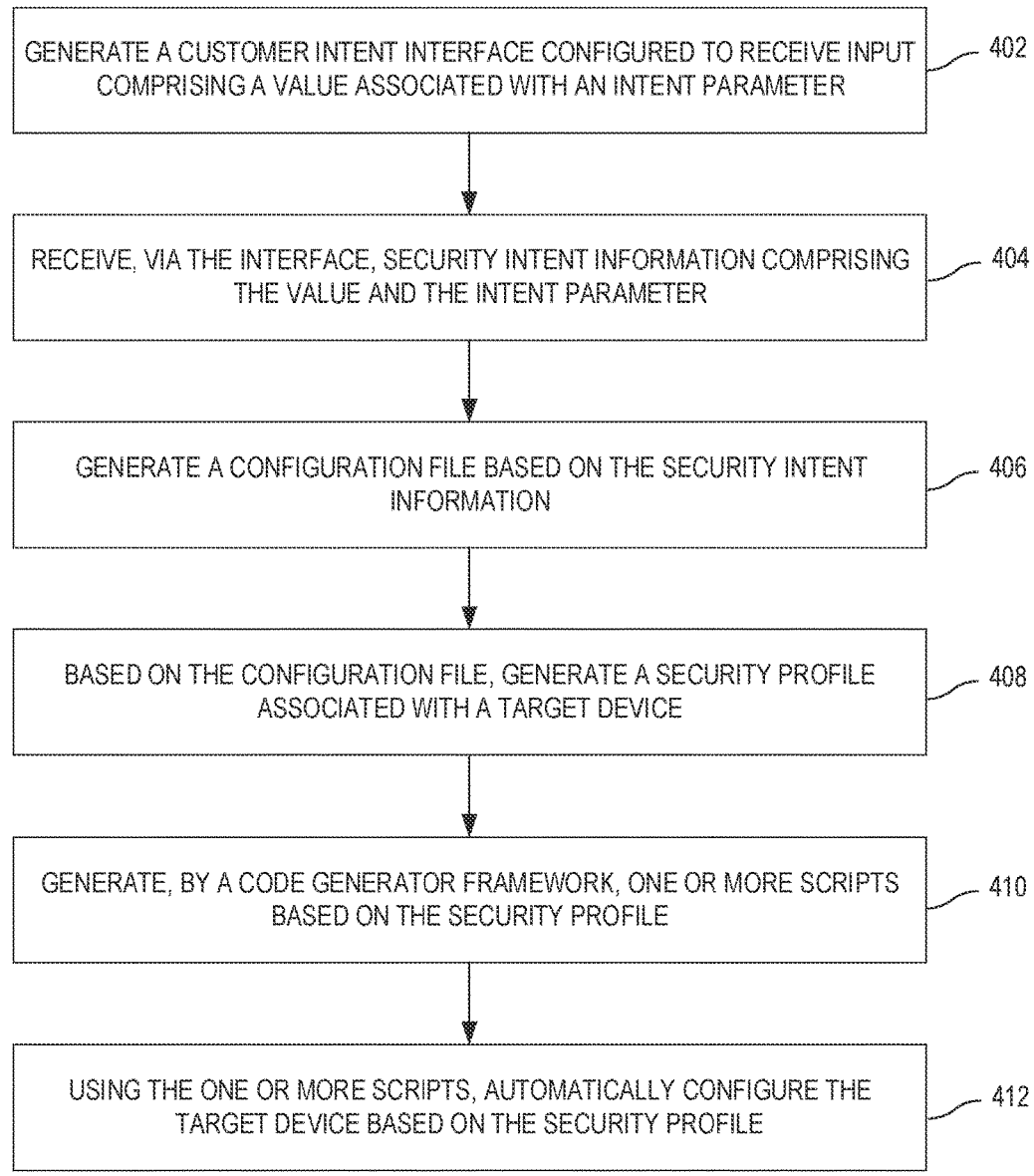
FIG. 4 is a flowchart illustrating an example method for generating and implementing a security profile, in accordance with disclosed embodiments.

FIG. 4 is a flowchart of a method 400 for generating and implementing a security profile for a target device, in accordance with disclosed embodiments. Although execution of method 400 is described below with reference to system 100, method 400 may be executed by system 200 or computing device 300. Additionally, the components for executing the method 400 may be spread among multiple devices. Method 400 may be implemented in the form of executable instructions stored on a machine-readable storage medium, such as storage medium 304 of computing device 300, and/or in the form of electronic circuitry.

At step 402, the system may generate a customer intent interface configured to receive input (e.g., the selection of a value) associated with an intent parameter. For example, the interface may be displayed to a user via client device 102. The interface may display one or more intent parameters (e.g., a physical security need, a compliance requirement, an asset security need, a management network security requirement, a data center security requirement, an authentication requirement, a security detection requirement, or a security recovery requirement). Each intent parameter may have one or more selectable values (e.g., "High," "Medium," "Standard," etc.).

At step 404, the system may receive, via the customer intent interface, security intent information associated with an intent parameter. For example, a user may select a value for one or more of the displayed intent parameters as discussed above with reference to FIG. 2B. Security intent information may include the intent parameters and their respective selected values. In some embodiments, the system may also receive input indicative of a target device or target devices, e.g., a target device type or target device ID, for which the user wishes to establish a security profile. In some embodiments, a list of target devices may be retrieved from a database storing a device inventory associated with the user.

At step 406, the system may generate a configuration file based on the intent parameters and their selected values. The configuration file may be an XML or JSON file capturing the security requirements of the user. In some embodiments, the configuration file may include a device inventory or product identifier, such as a device type or device ID of the target device.

In some embodiments, the product identifier may include a component identification associated with a component of the target device.

At step 408, based on the configuration file, the system may generate a security profile. As previously described, the security profile may include settings for each component of the target device to cause the device to be in compliance with the security intent information provided by the user.

At step 410, the system may generate, by a code generator framework, e.g., code generator framework 214, one or more scripts based on the security profile. The scripts may be configured to adjust one or more controls of components of the target device to adjust the security level of the device. For example, the generated scripts may be tool-specific and may include deployable IaC modules to configure the components of the target device.

At step 412, the system may use the one or more scripts to automatically configure a device (e.g., the target device), based on the security profile. For example, the system may deploy the scripts on the device, thereby updating or setting the security controls of the device to have the values specified in the security profile. In other embodiments, the scripts may be pushed to one or more configuration management tool servers (e.g., configuration management tool 114), which then deploys the scripts on the appropriate devices.

Figure 5:
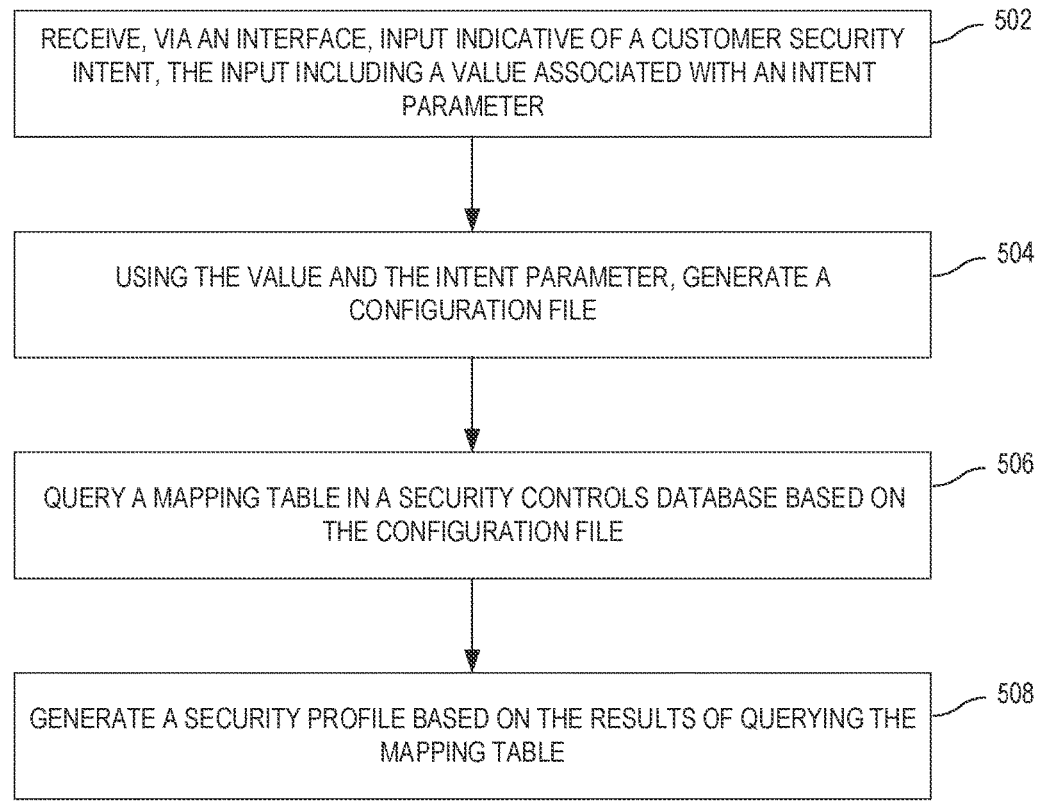
FIG. 5 is a flowchart illustrating an example method for generating a security profile, in accordance with disclosed embodiments.

FIG. 5 is a flowchart of a method 500 for generating a security profile for a target device, in accordance with disclosed embodiments. Although execution of method 500 is described below with reference to system 100, method 500 may be executed by system 200 or computing device 300. Additionally, the components for executing the method 500 may be spread among multiple devices. Method 500 may be implemented in the form of executable instructions stored on a machine-readable storage medium, such as storage medium 304 of computing device 300, and/or in the form of electronic circuitry.

At step 502, the system may receive, via an interface, input indicative of a customer security intent, the input including an intent parameter and value associated with the intent parameter.

At step 504, the system may generate a configuration file. The configuration file may be, for example, an executable file specifying the security intent parameter and desired value with each intent parameter mapping to a high level security category. In some embodiments, the configuration file may include an identifier of the target device. In other embodiments, the configuration file may capture the security intent information (e.g., the intent parameter and selected value) in a declarative syntax. In some embodiments, the system may store the configuration file in an intent database, e.g., database 106, 204.

At step 506, the system may query a mapping table in a security controls database (e.g., database 112, 210) based on the configuration file. For example, the mapping table may be associated with a device profile and may map the security intent information (e.g., intent parameters and their associated values) to device component security control settings. The is mapping may indicate values of the settings that are compliant with the security intent information.

At step 508, the system may generate a security profile for the target device based on the results of querying the mapping table. For example, for a target device, the mapping table may map a value of "High" for an intent parameter to settings of one or more components on the target device. The security profile may identify the required settings.

In some embodiments, the security controls database may be periodically updated to reflect new standards or responses to new security threats. In response to the update, the system may update any existing security profiles and generate the scripts necessary to cause the target devices to be in compliance with the updated requirements.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

I claim:

1. A system comprising:
a processor; and
a non-transitory storage medium storing instructions executable on the processor to:
receive, via a user interface, security intent information comprising values of security parameters, the security parameters comprising an authentication parameter representing an authentication requirement for a target device, and a compliance parameter representing a security standard according to which the target device is to comply;
generate a configuration file based on the security intent information, the configuration file comprising the values of the security parameters;
based on the configuration file, generate a security profile associated with the target device, the security profile generated by querying a security controls database that maps different values of security parameters to respective security control settings, wherein the security profile contains identified security control settings obtained based on the querying of the security controls database using the values of the security parameters in the configuration file; and
generate, by a code generator framework, one or more scripts based on the security profile.

2. The system of claim 1, wherein the security parameters in the security intent information further comprise a physical security parameter relating to a physical security of the target device.

3. The system of claim 1, wherein the instructions are executable on the processor to:
deploy the one or more scripts on the target device.

4. The system of claim 1, wherein the security controls database further maps a product identifier associated with the target device to the security control settings.

5. The system of claim 1, wherein the security control settings comprise settings selected from among an encryption setting, a port access setting, and an authentication setting.

6. The system of claim 1, wherein the instructions are executable on the processor to:
generate the one or more scripts by using the security profile to automatically generate deployable infrastructure-as-code modules.

7. The system of claim 1, wherein the instructions are executable on the processor to:
test a validity of the one or more scripts.

8. The system of claim 1, wherein the instructions are executable on the processor to:
receive an updated compliance parameter representing a different security standard according to which the target device is to comply; and
responsive to the updated compliance parameter,
generate an updated security profile by querying the security controls database using the updated compliance parameter, and
generate, by the code generator framework, one or more updated scripts based on the updated security profile.

9. The system of claim 1, wherein each of the one or more scripts is to modify a security setting of a component of the target device.

10. A method comprising:
receiving, by a system comprising a hardware processor from a user interface, security intent information comprising values of security parameters, the security parameters comprising an authentication parameter representing an authentication requirement for a target device, and a compliance parameter representing a security standard according to which the target device is to comply;
generating, by the system, a configuration file based on the security intent information, the configuration file comprising the values of the security parameters;
based on the configuration file, generating, by the system, a security profile for the target device, the security profile generated by querying a security controls database that maps different values of security parameters to respective security control settings, wherein the security profile contains identified security control settings obtained based on the querying of the security controls database using the values of the security parameters in the configuration file; and
generating, by a code generator framework, one or more scripts based on the security profile.

11. The method of claim 10, wherein the security parameters in the security intent information further comprise a physical security parameter relating to a physical security of the target device.

12. The method of claim 10, further comprising:
deploying the one or more scripts on the target device.

13. The method of claim 10, wherein the security controls database further maps a product identifier of the target device to the security control settings.

14. The method of claim 10, wherein the security control settings comprise settings selected from among an encryption setting, a port access setting, and an authentication setting.

15. The method of claim 10, wherein the generating of the one or more scripts comprises:
using the security profile to automatically generate deployable infrastructure-as-code modules.

16. The method of claim 10, further comprising:
receiving, by the system, an updated compliance parameter representing a different security standard according to which the target device is to comply; and
responsive to the updated compliance parameter,
generating, by the system, an updated security profile by querying the security controls database using the updated compliance parameter, and
generating, by the code generator framework, one or more updated scripts based on the updated security profile.

17. The method of claim 10, wherein each of the one or more scripts is to modify a security setting of a component of the target device.

18. A non-transitory computer-readable medium storing instructions that, when executed, cause a system to:
receive, via a user interface, security intent information comprising values of security parameters, the security parameters comprising an authentication parameter representing an authentication requirement for a target device, and a compliance parameter representing a security standard according to which the target device is to comply;
generate a configuration file based on the security intent information, the configuration file comprising the values of the security parameters;
based on the configuration file, generate a security profile for the target device, the security profile generated by querying a security controls database that maps different values of security parameters to respective security control settings, wherein the security profile contains identified security control settings obtained based on the querying of the security controls database using the values of the security parameters in the configuration file;

generate, by a code generator framework, one or more scripts based on the security profile; and using the one or more scripts, automatically configure one or more security settings of the target device.

19. The non-transitory computer-readable medium of claim 18, wherein the instructions when executed cause the system to:

receive an updated compliance parameter representing a different security standard according to which the target device is to comply; and responsive to the updated compliance parameter, generate an updated security profile by querying the security controls database using the updated compliance parameter, and generate, by the code generator framework, one or more updated scripts based on the updated security profile.

20. The non-transitory computer-readable medium of claim 18, wherein the security control settings comprise settings selected from among an encryption setting, a port access setting, and an authentication setting.

* * * * *